Figure 1:
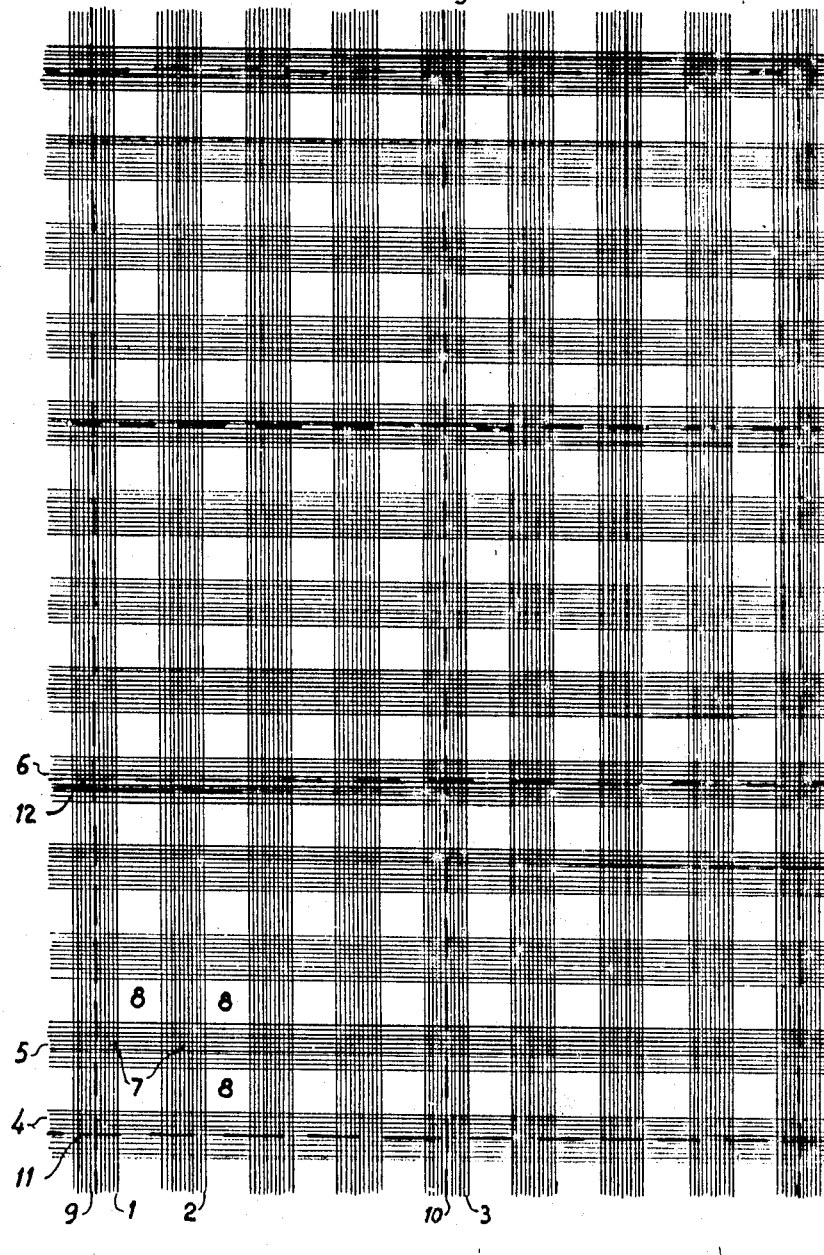

Aug. 10, 1965     S. E. KNUTSON ETAL     3,199,547
CAMOUFLAGE NET
Filed Feb. 21, 1963     2 Sheets-Sheet 1

INVENTORS
Stig Erik Knutson
BY Roland Karl Wallin

United States Patent Office 3,199,547
Patented Aug. 10, 1965

3,199,547
CAMOUFLAGE NET
Stig Erik Knutson, Stockholm, and Roland Karl Wallin, Sollentuna, Sweden, assignors to Mölnlycke Aktiebolag, Gothenburg, Sweden, a corporation of Sweden
Filed Feb. 21, 1963, Ser. No. 260,132
Claims priority, application Norway, Mar. 5, 1962, 143,510
2 Claims. (Cl. 139—383)

Nets of different constructions for camouflaging military objects and plants are known in the art. For camouflaging in summer it is common practice to use natural fibre nets with interlaced strips of jute or artificial fibre nets with patches of plastic film pasted thereto. The manufacture of both types of net requires much manual work, and both types are of high or comparatively high dry weight. Further, the net comprising strips of jute is of high volume per unit of surface and has a camouflaging effect which, after some time of use, is rapidly reduced because of the fact that the strips become narrower. A net of plastic has a lower heat resistance than a textile net and is glossy when it becomes wet.

For camouflaging purposes in winter there are used linen sheetings or patches of sheeting mounted on a net of natural fibre. Linen sheetings have a comparatively high dry weight, high water absorption, a poor camouflaging effect, low tear resistance, and are sensitive to dirtying. Further, reconnaissance from inside the camouflage through the sheeting is impossible. A net having sewed on patches of sheeting has a high dry weight, high water absorption, poor camouflaging effect, large volume per unit of surface and is not protected against rot, since the skeleton of the net is not impregnated in order to prevent discoloring of the sheeting in connection with washing.

The present invention has for its object to provide a camouflage net in which the above named disadvantages are entirely or partly eliminated as regards both summer nets and winter nets. This camouflage net consists of a wide meshed supporting net and a covering net, said nets being interwoven in the form of a single fabric comprising warp and weft. In contrast to conventional nets in which all net-forming threads are supporting threads the number of supporting threads in this net is considerably reduced due to the fact that the supporting threads form a wide-meshed supporting net which is devised such that it can be manufactured by the same weaving operation as the covering net. As a result thereof, the camouflage net not only has a low dry weight but can be manufactured in accordance with a simple operation. Consequently, the dry weight of a net for summer use devised in accordance with the invention can be as low as 0.4 to 0.68 oz. per square foot and the dry weight of a net for winter use is 0.32 to 0.4 oz., per square foot, whereas for example a natural fibre net with interlaced strips of jute of known type has a dry weight of 1.28 to 1.44 oz. per square foot and an artificial fibre net with patches of plastic pasted thereto has a dry weight of 0.8 to 0.86 oz. per square foot.

The covering net according to the invention consists of spaced apart groups of warp and spaced apart groups of weft such as to form tight portions of fabric at the crossings of the threads alternately with openings. The covering net is constructed such that the covered parts due to the resolving power of the eye at a determinable distance will bridge the openings of the net. Consequently, it is easy to look out through the camouflage, but it is not possible to look in from the outside. Further, the openings allow rain-water to pass through which is not the case if conventional sheetings are used which accumulate thawed water especially if they are impregnated.

The woven supporting net, too, may consist of spaced apart groups of warp and spaced apart groups of weft threads in which case the distance between the groups of the supporting net is considerably greater than the distance between the groups of the covering net. By way of example, the distance between the groups of threads of the supporting net may be such that two to five groups of threads of the covering net are provided between each pair of groups of supporting threads.

Figure 2:
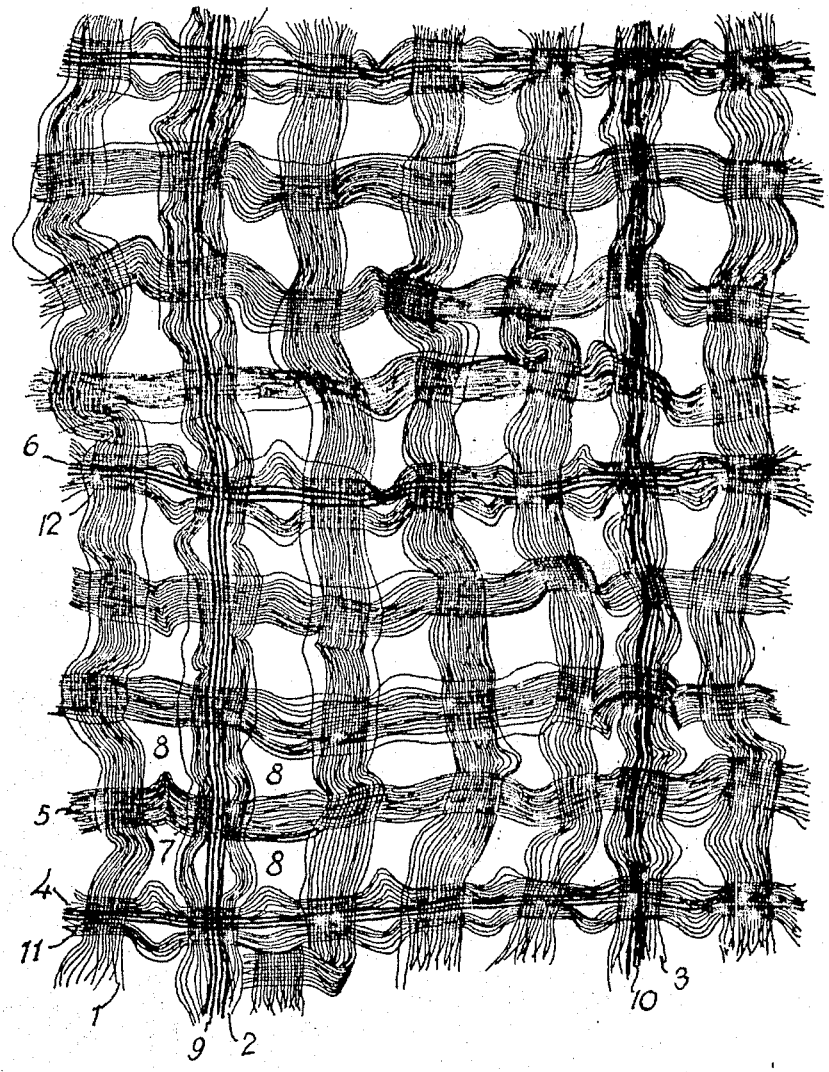

An embodiment of a camouflage net is illustrated by way of example in the accompanying drawing in which FIG. 1 is a diagrammatic view of a fabric for making a camouflage net prior to a shrinking treatment and FIG. 2 shows the same fabric after the shrinking treatment.

Referring to the drawing the covering net consists of groups 1, 2, 3 of warp and crossing groups 4, 5, 6 of weft. By way of example the threads of the warps and wefts may consist of cotton or rayon staple. At the crossings comparatively tight portions 7 are formed. Since the groups are spaced apart, there are openings 8 between the groups. The tight portions, the intermediate threads and the openings are so related to each other that the covering portions bridge the openings in the net due to the resolving power of the eye at a determinable distance which is considerably smaller than the normal reconnoitring distance. As a result thereof it is easy to look out through the camouflage net, while it is not possible to look inwards through the net from reconnoitring distances.

The covering net has interlaced groups 9, 10 and 11, 12 of threads which cross each other and together form a comparatively wide meshed supporting net interwoven in the fabric of the covering net. The groups 9, 10 of threads as well as the groups 11, 12 are located at comparatively great distances from each other said distances being considerably greater than the distances between the groups of threads 1, 2, 3 and 4, 5, 6 of the covering net. In the embodiment illustrated the distance between the groups of threads of the supporting net is such that four groups of threads of the covering net are provided between each pair of groups of supporting threads. The distance between the groups of threads of the supporting net may be greater or smaller. For instance five to eight groups of covering threads may be provided between each pair of groups of supporting threads.

The threads of the supporting net are advantageously made from a stronger material than the threads of the covering net. For instance, the first-named threads may consist of a suitable plastic.

Prior to the use the fabric is subjected to a treatment such that different types of threads comprised in the fabric will shrink to different extents so that the fabric in a manner known per se will assume a warp appearance of a certain depth. FIG. 2 illustrates the fabric after the shrinking treatment. The fabric may also be dressed and dyed in combination with an addition of rot resistant and flame guarding agents.

A net of the construction described can be used both in summer and winter. For use in summer the net is dyed in desired colours and patterns and for use in winter it is bleached and dressed to obtain the desired whiteness. The material of the net can also be impregnated for various purposes, for instance such as to become water repelling and highly heat resisting and protected against rot. The camouflaging effect of the net described is high both in summer and winter.

What is claimed is:
1. A camouflage unit comprising a wide-meshed supporting net consisting of spaced-apart groups of warp and spaced-apart groups of weft threads, and a covering net consisting of spaced-apart groups of warp and spaced-apart groups of weft threads, said supporting net warp and weft threads overlapping warp and weft threads, respectively, of said covering net, said nets being interwoven to form a single fabric in which the distance between the groups of the supporting net is considerably greater than the distance between the groups of the covering net, said camouflage unit being further characterized in that threads used in the covering net have different shrinkage characteristics than have threads used in the supporting net, whereby puckering of less shrinkable threads ensues upon shrinkage, and in that at least two to five groups of threads of the covering net are provided between each pair of groups of supporting threads.

2. A camouflage unit as claimed in claim 1 and further characterized in that said supporting net comprises threads of stronger material than are the threads forming the groups of the covering net.

References Cited by the Examiner

UNITED STATES PATENTS

| 442,116 | 12/90 | Heitz | 139—383 |
| 2,354,765 | 8/44 | Meyer et al. | |

FOREIGN PATENTS

| 1,155,033 | 9/63 | Germany. |
| 22,146 | 1902 | Great Britain. |
| 122,076 | 1/19 | Great Britain. |

OTHER REFERENCES

German printed application, Schonefeld et al., December 8, 1955.

Ser. No. 378,286, Schwimmer et al. (A.P.C.), published April 27, 1943.

DONALD W. PARKER, *Primary Examiner.*